United States Patent
Malnar (10) Patent No.: US 11,164,496 B2
(45) Date of Patent: Nov. 2, 2021

(54) INTERRUPT-FREE MULTIPLE BUFFERING METHODS AND SYSTEMS

(71) Applicant: Channel One Holdings Inc., Tampa, FL (US)

(72) Inventor: Tomislav Malnar, Wellesley (CA)

(73) Assignee: Channel One Holdings Inc., Tampa, FL (US)

( * ) Notice: Subject to any disclaimer, the term of this patent is extended or adjusted under 35 U.S.C. 154(b) by 41 days.

(21) Appl. No.: 16/731,500

(22) Filed: Dec. 31, 2019

(65) Prior Publication Data

US 2020/0219430 A1     Jul. 9, 2020

Related U.S. Application Data (60) Provisional application No. 62/788,276, filed on Jan. 4, 2019.

(51) Int. Cl.
  *G09G 5/393* (2006.01)
  *G09G 5/399* (2006.01)
  (Continued)

(52) U.S. Cl.
  CPC ............. *G09G 3/20* (2013.01); *G06T 1/20* (2013.01); *G06T 1/60* (2013.01); *G09G 5/393* (2013.01);
  (Continued)

(58) Field of Classification Search
  None
  See application file for complete search history.

(56) References Cited

U.S. PATENT DOCUMENTS 6,128,026 A * 10/2000 Brothers, III .......... G09G 3/003
                                                         345/503
6,145,025 A * 11/2000 Lim ........................ G06F 13/28
                                                         710/22

(Continued)

FOREIGN PATENT DOCUMENTS

EP     2128824    12/2009
EP     3336833    6/2018

(Continued)

OTHER PUBLICATIONS

Pichon, Jean-Michel, "Extended European Search Report"; dated Jul. 11, 2019 for Application No. 18182141.4 European Patent Office, The Hague, Netherlands.

(Continued)

*Primary Examiner* — Joni Hsu
(74) *Attorney, Agent, or Firm* — Woods Oviatt Gilman LLP; Dennis B. Danella, Esq.

(57) ABSTRACT

Methods and systems for multiple-buffered display rendering without the use of hardware or software interrupts. In a first repeating process, a processor writes data for a frame a selected frame buffer and, upon completion of the frame, a swap buffer signal is transmitted. In response to the swap buffer signal, the GPU updates a memory register of the display controller to indicate that the selected frame buffer can be used in the next display synchronization interval. In a separate repeating process, the display controller monitors memory register and, in a display synchronization interval, identifies the frame buffer to use for display.

15 Claims, 9 Drawing Sheets

(51) Int. Cl.
  *G06T 1/60* (2006.01)
  *G09G 3/20* (2006.01)
  *G06T 1/20* (2006.01)
(52) U.S. Cl.
  CPC ......... *G09G 5/399* (2013.01); *G09G 2360/08* (2013.01); *G09G 2360/12* (2013.01); *G09G 2360/18* (2013.01)

(56) References Cited

U.S. PATENT DOCUMENTS

| | | | |
|---|---|---|---|
| 6,247,084 B1* | 6/2001 | Apostol, Jr. | G06F 13/1684 |
| | | | 710/100 |
| 7,383,412 B1* | 6/2008 | Diard | G06F 9/52 |
| | | | 711/170 |
| 7,586,492 B2 | 9/2009 | Riach et al. | |
| 8,373,708 B2 | 2/2013 | Parikh et al. | |
| 8,484,647 B2 | 7/2013 | Ian et al. | |
| 8,786,674 B2 | 7/2014 | Guoping et al. | |
| 8,797,340 B2 | 8/2014 | Slavenburg et al. | |
| 8,860,741 B1* | 10/2014 | Juffa | G06F 12/0831 |
| | | | 345/557 |
| 10,339,891 B2 | 7/2019 | Colenbrander | |
| 2007/0046679 A1* | 3/2007 | Tanaka | G06T 1/00 |
| | | | 345/501 |
| 2010/0020088 A1 | 1/2010 | Harumoto | |
| 2010/0128045 A1* | 5/2010 | Inamoto | G09G 5/393 |
| | | | 345/545 |
| 2012/0133732 A1 | 5/2012 | Li | |
| 2012/0287337 A1* | 11/2012 | Kumar | H04N 5/14 |
| | | | 348/425.1 |
| 2013/0328896 A1* | 12/2013 | Belanger | G09G 5/39 |
| | | | 345/531 |
| 2017/0154403 A1 | 6/2017 | Toth et al. | |
| 2017/0228855 A1 | 8/2017 | Bates | |
| 2018/0165786 A1* | 6/2018 | Bourd | G06T 15/005 |
| 2018/0197509 A1 | 7/2018 | Yoshiyuki et al. | |
| 2019/0043156 A1 | 2/2019 | Aidan | |
| 2019/0370928 A1 | 12/2019 | Gregory et al. | |

FOREIGN PATENT DOCUMENTS

| | | |
|---|---|---|
| WO | 9940518 | 8/1999 |
| WO | 2006126042 | 11/2006 |
| WO | 2017026230 | 2/2017 |

OTHER PUBLICATIONS

Giancane, Iacopo, "Extended European Search Report"; dated Jul. 16, 2019 for Application No. 19177537.8; European Patent Office, Munich, Germany.

Manseau, Danielle, "PCT Notification of Transmittal of the International Search Report and the Written Opinion of the International Searching Authority, or the Declaration", PCT International Application No. PCT/CA2019/050009 filed on Jan. 4, 2019, dated Sep. 6, 2019, Gatineau, Quebec.

Ricks, Donna J., "Office Action", notification date Sep. 3, 2019 for U.S. Appl. No. 16/027,525, United States Patent and Trademark Office, Alexandria, VA.

Mazumder, Saptarshi, "Office Action", notification date Apr. 30, 2020 for U.S. Appl. No. 16/428,072, United States Patent and Trademark Office, Alexandria, VA.

\* cited by examiner

INTERRUPT-FREE MULTIPLE BUFFERING METHODS AND SYSTEMS

CROSS-REFERENCE TO RELATED APPLICATION

This application claims the benefit of U.S. Provisional Application No. 62/788,276, filed on Jan. 4, 2019, which is incorporated by reference herein in its entirety.

FIELD

The embodiments disclosed herein relate to rendering computer graphics and, in particular, to methods and systems for buffering images for display in safety-critical environments, such as in aviation.

INTRODUCTION

The following paragraphs are not an admission that anything discussed in them is prior art or part of the knowledge of persons skilled in the art.

Graphical applications running in a safety-critical environment may require assurances that display data is free from defects and artifacts, and represent the data that is actually intended for display by graphical applications.

Figure 7:
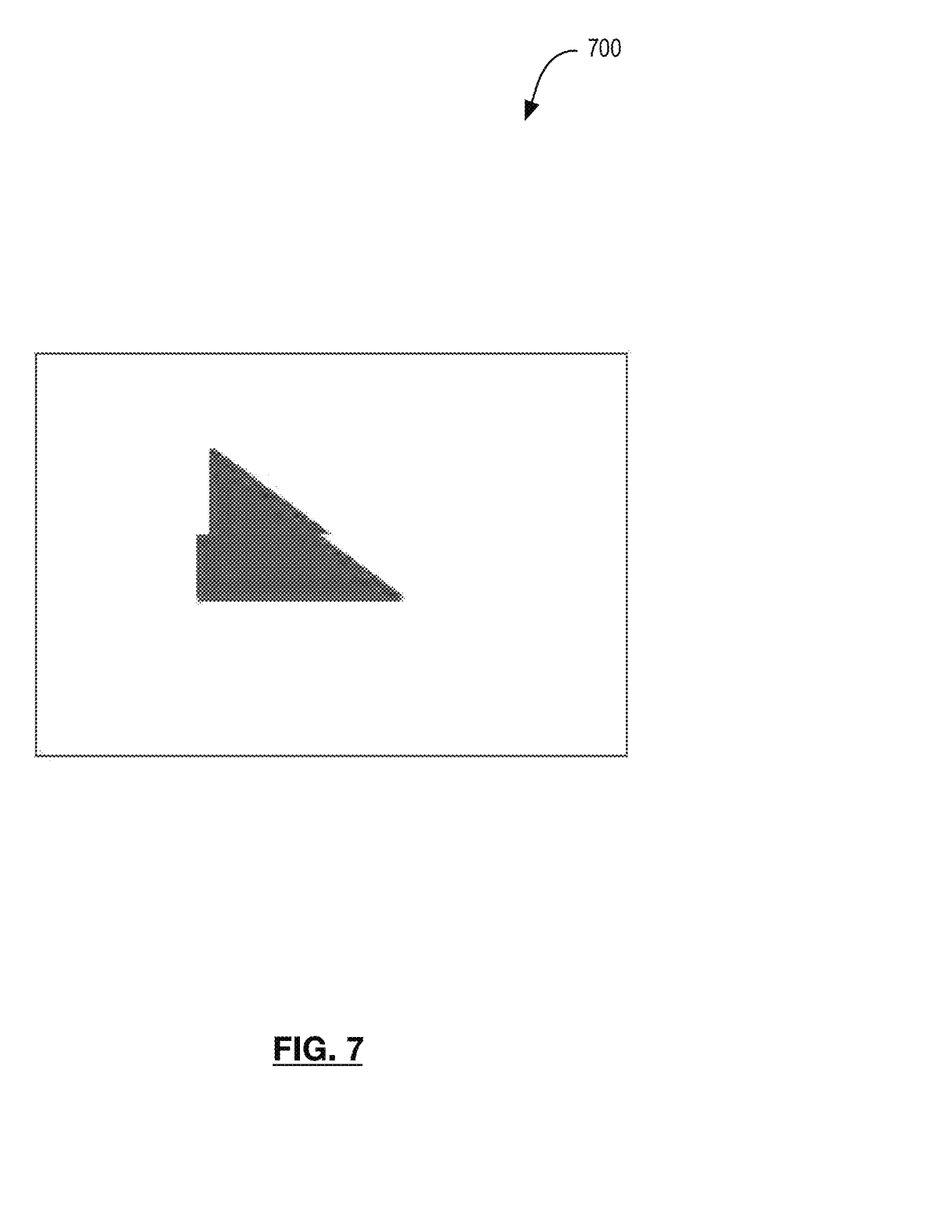
FIG. 7 is an example display screen.

Discrete graphics hardware chipsets generally have a graphics rendering core and a display controller. They also typically have their own dedicated memory chips different from those of the computer's central processing unit (CPU). In some cases, these components memory may be on a peripheral card, such as typically fits into a desktop personal computer. In other cases, these components may be integrated into the computer motherboard itself. In this configuration, the rendering surface and display surface memory of these discrete memory chips can be shared, this is typically called a frame buffer. The CPU sends commands to the graphics processing unit (GPU) to coordinate what is being drawn and what is being shown on the display controller at any given point. A use case for many avionics systems, for example, is to ensure that the display controller only changes the image being shown during the vertical refresh cycle of given display, which occurs for example at a rate of 60 frames per second (FPS). This may be desired to avoid frame "tearing" which is a condition where the GPU could be drawing an image to the same buffer being shown on the display, but at a different FPS. When this occurs, fast moving objects in the image can appear to tear since the GPU is drawing asynchronously to the display controller reading the data. A fast-moving object can appear partially in its current position and partially in a previous position within the same image being shown on the display. An example of this effect is illustrated in FIG. 7.

To circumvent this condition, multiple frame buffers may be used. The use of multiple frame buffers means that the GPU may draw to one buffer, and the display controller may read from a separate buffer, such that the GPU and display controller can operate independently of each other and avoid writing to, and reading from, a single buffer simultaneously. This technique is called double buffering when two buffers are used, triple buffering when three buffers are used. Generically, the term multiple buffer, or multibuffer, can be used to mean two or more frame buffers.

Traditional implementations of triple buffering rely on the use of hardware or software interrupts (i.e., signals that cause the execution of lower-priority code to be interrupted in favor of the execution of higher-priority code) to select which of the three buffers is to be shown during a next display synchronization interval of the display hardware. In part this is because graphics rendering is time-sensitive and a heavily loaded processor may be otherwise unable to process the reading and writing of frame data quickly enough to ensure that the GPU reads complete frame data. In doing so, the system allows for maximum performance in the generation of frame data, minimal latency in displaying the frame data, and therefore a smooth flow of frame data to the display, free artifacts.

Furthermore, technological advances in the graphics industry have given rise to sophisticated GPUs alongside multicore CPUs in a system on a chip (SoC) configuration. In this configuration the memory, buses, and physical die of the chip may be shared between CPU, GPU and display controller. In many cases the display controller core and GPU core are completely different entities and may lack commands to synchronize or coordinate internally between the cores; the system may therefore be forced to rely on system memory and buses for the exchange of information between cores. In some cases, the cores may be supplied from completely different third-party vendors. The CPU is generally used as the executive to coordinate the exchange of data between the display controller and GPU cores. In many cases the memory cannot be shared as-is and copies of the data must be made and formatted according to the requirements of each core.

In such cases, a typical approach by the CPU to use interrupts and interrupt service routines (ISRs) to perform this coordination between the cores. However, in some systems, such as safety critical real-time systems, the use of interrupts may not be desirable, or possible, which makes it difficult to perform this coordination, and to take advantage of the traditional multiple buffering approach. Even where interrupts are possible, their use may cause significant difficulties when certifying the system to ensure that it is reliable and free of potentially critical errors or race conditions.

SUMMARY

In a first broad aspect, there is provided a method of display buffering between a processor, a GPU and a display controller, the method comprising: providing a plurality of frame buffers in a memory accessible to the processor, the GPU and the display controller, the plurality of frame buffers interchangeably designated as a front buffer and one or more back buffers; in a first repeating process: the processor writing data for a selected frame to a selected frame buffer of the plurality of frame buffers in the memory; upon completing the selected frame, the processor transmitting a swap buffer signal to the GPU; in response to the swap buffer signal, the GPU updating the display controller to indicate that the selected frame buffer is a ready frame buffer that is to become the front buffer when a display synchronization interval occurs; updating the selected frame buffer to one other of the one or more back buffers; and in a second repeating process carried out asynchronously to the first repeating process: the display controller monitoring for the display synchronization interval of a display to begin; upon start of the display synchronization interval, the display controller identifying the ready frame buffer; and in response to determining the ready frame buffer, the display controller setting the ready frame buffer as the front buffer and transmitting contents of the front buffer to the display.

The method may further comprise, in the first repeating process, prior to writing data to the selected frame buffer, the processor choosing the selected frame buffer from the one or more back buffers.

In some cases, the processor chooses the selected frame buffer based on its availability to accept new data.

In some cases, the GPU updating the display controller comprises a DMA engine of the GPU writing to a register of the display controller.

In some cases, the writing to the register comprises block writing to a plurality of registers comprising the display register.

In some cases, the ready frame buffer is determined from the register of the display controller.

In some cases, the register indicates a memory address of the selected frame buffer in the memory.

In some cases, the memory is directly accessible by the display controller.

In another broad aspect, there is provided a non-transitory computer readable medium storing computer-executable instructions, which when executed by a graphics unit comprising first and second command processors, cause the graphics unit to carry out the methods described herein.

In still another broad aspect, there is provided a system for non-interrupt-based asynchronous display buffering, the system comprising: a display; a memory, the memory storing a plurality of frame buffers, the plurality of frame buffers interchangeably designated as a front buffer and one or more back buffers; a processor, the processor configured to repeatedly: write image data for a selected frame to a selected frame buffer of the plurality of frame buffers in the memory; upon completing the selected frame, transmit a swap buffer signal; a GPU, the GPU configured to repeatedly, in response to the swap buffer signal, indicate that the selected frame buffer is a ready frame buffer that is to become the front buffer when a display synchronization interval occurs; and a display controller, the display controller configured to, repeatedly and asynchronously to operation of the processor and the GPU: monitor for the display synchronization interval of a display to begin; upon start of the display synchronization interval, identify the ready frame buffer; and in response to identifying the ready frame buffer, set the ready frame buffer as the front buffer and transmit contents of the front buffer to the display.

In some cases, prior to writing data to the selected frame buffer, the processor is configured to the selected frame buffer from the one or more back buffers.

In some cases, the processor chooses the selected frame buffer based on its availability to accept new data.

In some cases, indicating that the selected frame buffer is now the front buffer comprises a DMA engine of the GPU writing to a register of the display controller.

In some cases, the writing to the register comprises block writing to a plurality of registers comprising the display register.

In some cases, the ready frame buffer is determined from the register of the display controller.

In some cases, the register indicates a memory address of the selected frame buffer in the memory.

In some cases, the memory is directly accessible by the display controller.

DRAWINGS

For a better understanding of the various embodiments described herein, and to show more clearly how these various embodiments may be carried into effect, reference will be made, by way of example only, to the accompanying drawings which show at least one exemplary embodiment, and in which are now described.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

Various apparatus or processes will be described below to provide an example of one or more embodiments. No embodiment described below limits any claimed embodiment and any claimed embodiment may cover processes or apparatus that differ from those described below. The claimed embodiments are not limited to apparatus or processes having all of the features of any one apparatus or process described below or to features common to multiple or all of the apparatus described below. It is possible that an apparatus or process described below is not an embodiment of any claimed embodiment. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

The terms "an embodiment," "embodiment," "embodiments," "the embodiment," "the embodiments," "one or more embodiments," "some embodiments," and "one embodiment" mean "one or more (but not all) embodiments of the subject matter described in accordance with the teachings herein," unless expressly specified otherwise.

The terms "including," "comprising" and variations thereof mean "including but not limited to", unless expressly specified otherwise. A listing of items does not imply that any or all of the items are mutually exclusive, unless expressly specified otherwise. In addition, the terms "a," "an" and "the" mean "one or more," unless expressly specified otherwise.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical element or electrical signal (either wired or wireless) or a mechanical element depending on the particular context.

Further, although processes, methods, and the like may be described (in the disclosure and/or in the claims) having acts in a certain order, such processes and methods may be configured to work in alternate orders while still having utility. In other words, any sequence or order of actions that may be described does not necessarily indicate a requirement that the acts be performed in that order. The acts of processes and methods described herein may be performed in any order that is practical and has utility. Further, some actions may be performed simultaneously, if possible, while others may be optional, if possible.

When a single device or article is described herein, it may be possible that more than one device/article (whether or not they cooperate) may be used in place of a single device/article. Similarly, where more than one device or article is described herein (whether or not they cooperate), it may be possible that a single device/article may be used in place of the more than one device or article.

The term "GPU", as used herein, broadly refers to any graphics rendering device. This may include, but is not limited to discrete GPU integrated circuits, field-programmable gate arrays (FPGAs), application-specific integrated circuits (ASICs), discrete devices otherwise operable as central processing units, and system-on-a-chip (SoC) implementations. This may also include any graphics rendering device that renders two-dimensional (2D) or three-dimensional (3D) graphics.

Generally, graphical applications running in a safety-critical environment may require assurances that an image created by the GPU corresponds to the image that the graphical applications actually intended.

Many GPUs contain one or more independent GPU engines—specialized graphics processors that are adapted to perform certain graphical operations quickly and efficiently—and display controllers. A GPU engine—sometimes also called a 3D engine—generates graphical images, which are stored in temporary buffers, while the display controller shows the images on an attached monitor. A GPU engine may generate new images at any rate, e.g., from less than one frame per second, and up to thousands of frames per second. Moreover, the rate of frame generation may be context sensitive, and thus may change over time. In contrast, a display controller typically updates at a fixed rate, usually around 60 times per second.

The conventional approach for moving images from a GPU engine to the display is to use double buffering. As the name implies, in double buffered mode there are two available framebuffers for a GPU engine to draw into. Generally, a GPU engine will draw into the available buffers in a "ping-pong" order (i.e., 0, 1, 0, 1, etc.), and present the buffers to the display in the same order. Drawing into a buffer that is in the process of being displayed by the display controller would cause undesired visual artifacts, such as tearing. Therefore, generally the buffer that contains the currently displayed image data is locked, so that only the other buffer is used for writing new frame data. However, with only two buffers, one is always currently displayed, leaving only one available buffer to draw into. This forces the CPU and GPU engine into a fairly synchronous relationship and will often result in the CPU or GPU engine blocking while waiting for the display controller to finish with the buffer.

Another conventional approach is triple buffering, in which where there are three available frame buffers. As with double buffering, the GPU engine will draw into the buffers in round-robin order (0, 1, 2, 0, 1, 2, etc.) and present the buffers to the display controller in the same order. This allows the CPU and GPU engine to exhibit some degree of asynchronous behavior, where the CPU does not need to block or wait on the GPU engine, but it introduces up to two frames of latency before the most recently completed frame is shown. An improved form of triple buffering, sometimes called enhanced triple buffering, reduces this latency by always displaying the most recently completed frame, instead of displaying buffers in the order they are completed. This requires the GPU engine to keep track of which buffer is currently used by the display controller, and to alternate between the remaining two buffers. In each display controller processing period, or cycle, it chooses the most recently drawn buffer to be shown. Enhanced triple buffering ensures the display is always showing the most recently drawn frame, and that the GPU engine never needs to block on the display controller, but introduces complex control logic to enable its operation.

One example of an enhanced triple buffering sequence is demonstrated in Table 1. The example of Table 1 assumes an initial condition in which the GPU engine is drawing into frame buffer 0 and the display controller is displaying the contents of frame buffer 2. Likewise, the application is drawing frames at a rate of 100 Hz (i.e., period of 10 ms), while the display controller is displaying frames at a rate of 50 Hz (i.e., period of 20 ms).

TABLE 1

| Time (ms) | GPU engine | Display | Notes |
| --- | --- | --- | --- |
| 0 | 0 | 2 | Initial condition |
| 10 | 1 | 2 | Display controller still shows buffer #2, so GPU engine chooses next available buffer (i.e., buffer #0) for rendering |
| 20 | 0 | 1 | Display controller updates, chooses buffer #1 as most recently completed |
| 30 | 2 | 1 | Display controller still shows buffer #1, so GPU engine chooses next available buffer (i.e., buffer #2) for rendering |
| 40 | 0 | 2 | Display controller updates, chooses buffer #2 as most recently completed |
| 50 | 1 | 2 | Display controller still shows buffer #2, so GPU engine chooses next available buffer (i.e., buffer #1) |

As noted above, the enhanced triple buffering approach relies upon the ability for the GPU engine and display controller to exchange information, either with each other or with some external control mechanism (e.g., CPU).

The conventional approach for implementing enhanced triple buffering is to control the GPU engine and display controller using a CPU and hardware or software interrupts. In this approach, the GPU engine writes a "most recently completed frame number" value to CPU-accessible memory upon completing rendering of a frame. In parallel, the display controller triggers an interrupt in every display period. Therefore, in each display period, the CPU interrupt handler is invoked, at which point the CPU can read the most recently completed frame, and update the display controller to point to that buffer. The CPU can also update the "available to draw" buffer list so that the GPU engine does not draw to the newly displayed buffer.

In such an approach, care is generally taken to handle close timing scenarios. For example, the display controller typically has about 1 ms of "VBLANK" time during which the display can be updated without artifacts, so the interrupt handler must complete its work within that time. Also, the GPU engine may take some amount of time after the drawn frame is complete to write the frame number into CPU-accessible memory. Further timing issues can arise from the asynchronous operation of the GPU engine and CPU, and from the CPU drawing and swapping buffers at an extremely high rate.

Although enhanced triple buffering is generally desirable, particularly where low latency is important, many embedded and safety critical systems do not support interrupts, or do not support interrupts for external devices such as GPUs, and therefore cannot implement interrupt-based enhanced triple buffering.

In addition, existing techniques for using a CPU to coordinate drawing and displaying between a GPU core and display controller core can have several other drawbacks: i) the CPU can become a bottleneck, since it must be fast enough to handle the coordination between devices at whatever FPS they are running; ii) it takes the CPU away from other, possibly more critical, computations it could be performing (e.g., collecting flight data from an aircraft); iii) it requires that all operating systems and devices support hardware interrupts as well as the hardware supports interrupts, whereas in safety critical environments interrupts may be masked (blocked) as they can cause non-sequential CPU execution and are very difficult to test and certify; and iv) a driver must exist at the kernel level with kernel level privileges to service interrupts, whereas in safety critical environments third party driver developers generally desire to write drivers that exist in user application space, which provides an extra level of safety by not having the same privileges as kernel drivers. The latter option also avoids the necessity for access to third party developer code by the system integrators developing the kernels.

The described embodiments generally provide for the use of triple- or multiple-buffering techniques, without the use of hardware or software-based interrupts, as described further herein.

Throughout this description, the buffer in use by the display controller (e.g., being shown on the display) may be referred to as the "front buffer", and all other buffers may be referred to as "back buffers". Generally, the GPU may draw into any of the back buffers while the display controller reads from the front buffer. This allows the GPU and display controller to operate at different rates and FPS.

The display controller can be instructed which buffer is ready for use by the GPU. Accordingly, when the vertical refresh of the display occurs, the back buffer which is most recently filled and ready for display can become the front buffer. The previous front buffer can then become a back buffer ready for reuse by the GPU.

Figure 6A:
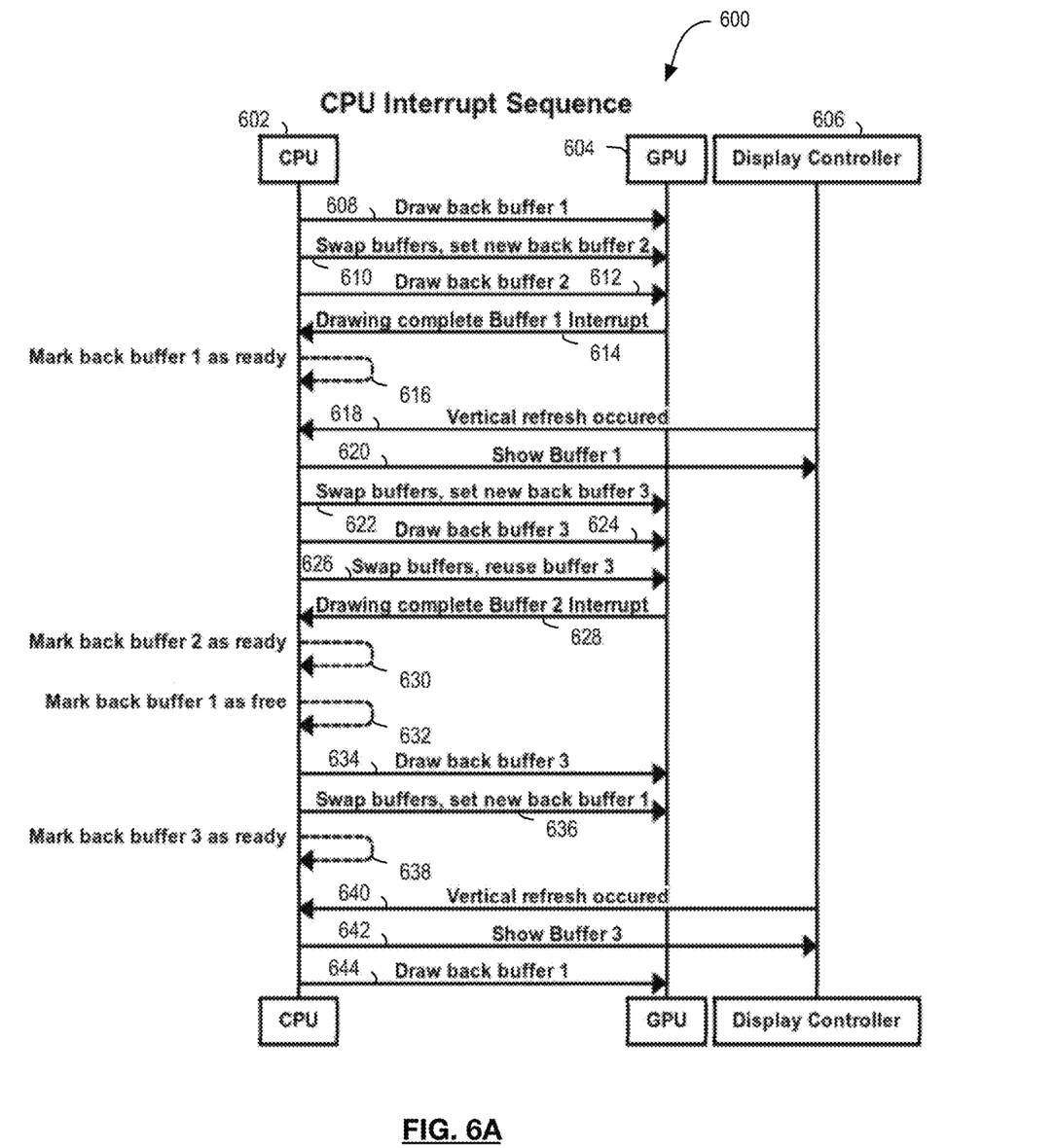
FIG. 6A is a timing diagram illustrating an asynchronous coordination approach for multiple buffering.

Referring to FIG. 6A, there is illustrated an example timing diagram for an asynchronous coordination approach by a CPU and GPU. Timing diagram 600 demonstrates the coordination a CPU performs between two asynchronous components. As can be seen, the GPU completes drawing at a higher FPS (e.g., at 614, 628) than the display refresh FPS (e.g., at 618, 640) of the display controller. Therefore, in this example, buffer 2 is completed at 628, but subsequently discarded before it can be displayed, since a newer back buffer—buffer 3—is marked as ready at 638.

Figure 6B:
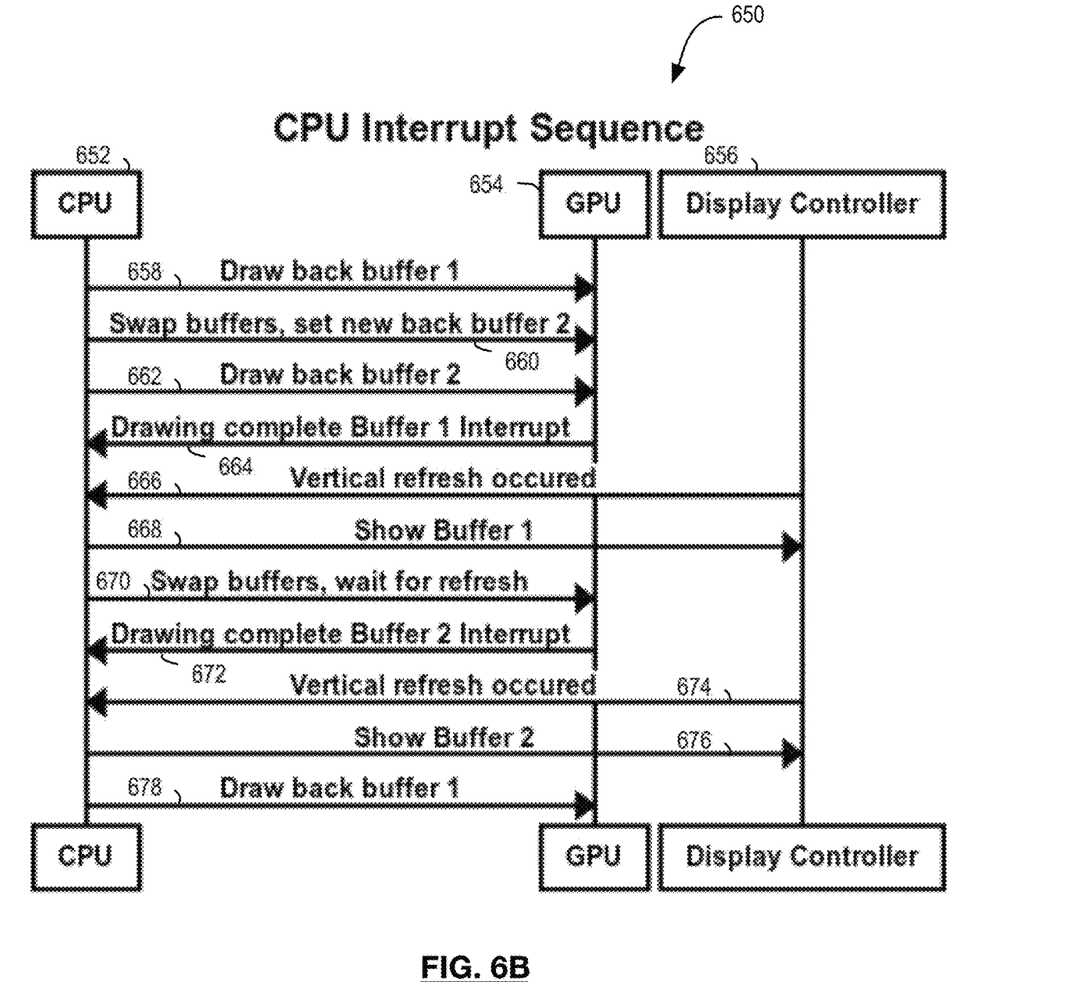
FIG. 6B is a timing diagram illustrating another asynchronous coordination approach for multiple buffering.

Referring now to FIG. 6B, there is illustrated another example timing diagram for an asynchronous coordination approach by a CPU and GPU. Timing diagram 650 illustrates a double buffering approach, in which, at 670, the CPU 652 instructs the GPU 654 to wait for display refresh to occur before drawing can continue, since there is no free buffer for the GPU to draw into (e.g., buffer 2 is still being drawn into, and buffer 1 has become the front buffer).

The described systems and methods generally allow for effective buffering without the need for interrupts, and without the need for a CPU to coordinate between the GPU and the display controller. For example, the described systems and methods allow: a CPU to be free to do other things than coordination; easy porting of drivers to safety critical operating systems and hardware, or for other applications where interrupts may be avoided; allows graphics and display drivers to remain in user space, which is typically a protected memory access space and time partitioned; and may, in some cases, improve performance as the CPU, GPU and display controller can operate freely at their maximum rates.

Figure 1:
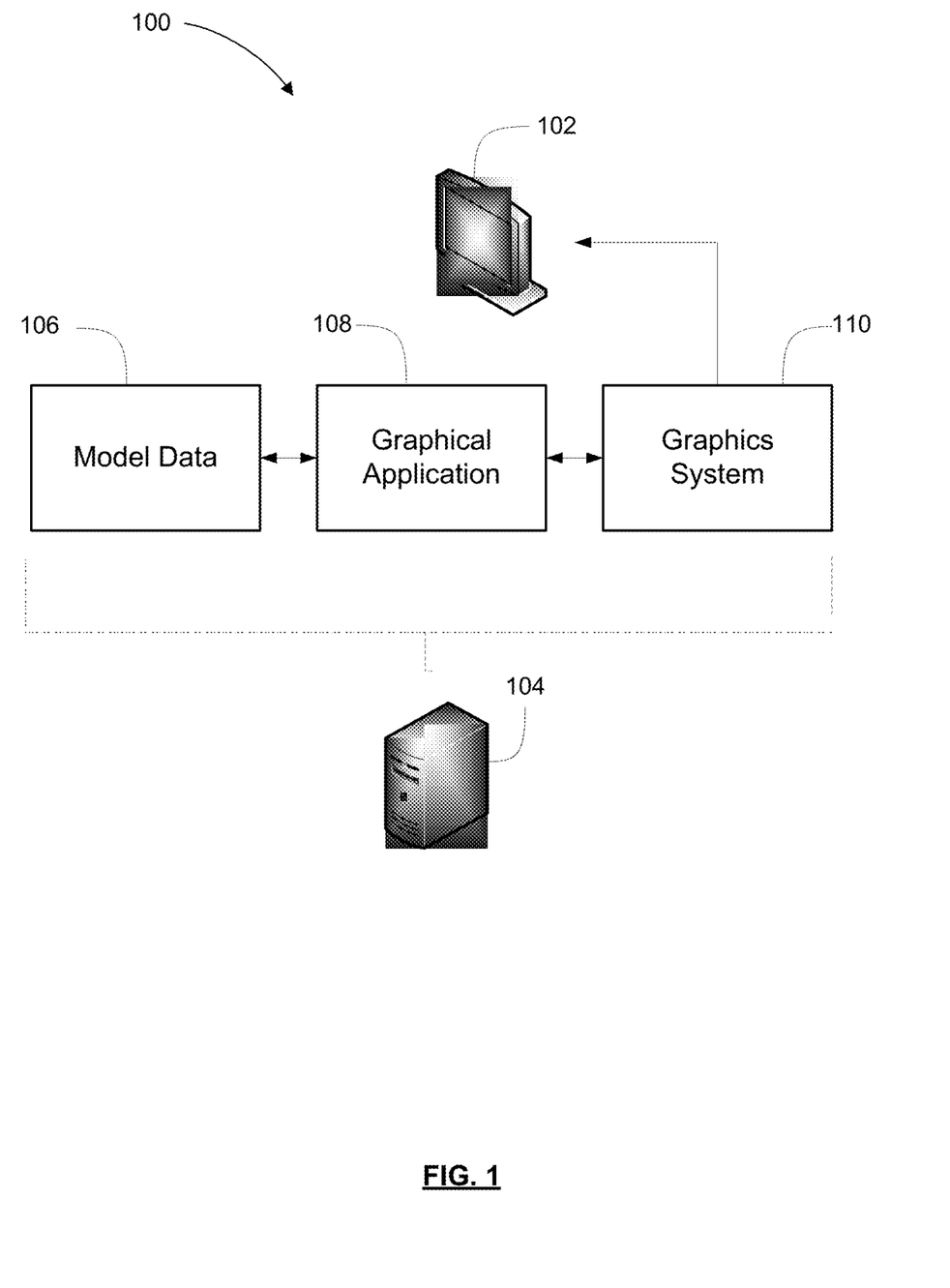
FIG. 1 is a schematic diagram of a host computer system according to at least one embodiment.

Referring now to FIG. 1, illustrated therein is a host computer system 100 according to at least one embodiment. The host computer system 100 comprises a computer display or monitor 102, and a computer 104. Other components of the system are not shown, such as user input devices (e.g., a mouse, a keyboard, etc.). Generally, the host computer system 100 may be used for displaying graphics objects or images on the display or monitor 102.

According to at least one embodiment, the host computer system 100 may be a computer system used in a motorized vehicle such as an aircraft, marine vessel, or rail transport vehicle, or in a medical imaging system, a transportation system, or any other system that uses a computer and monitor. In some cases, the computer system may be in use in a safety critical environment.

The computer 104 may generally include system memory, storage media, and a processor (CPU). In some cases, the computer 104 may also include dedicated graphics hardware, which may include a graphics system 110 and video memory. In other cases, the computer 104 may perform at least some graphics-related operations using the processor and system memory.

According to at least one embodiment, the host computer system 100 may be a safety-critical, mission-critical, or high-reliability system. In such a case, the host computer system 100 may be required to comply with specific operating standards, such as standards related to reliability and fault tolerance.

In order to display a rendering of the model data 106 on the monitor 102, such as may be determined by a graphical application 108 of the host computer system 100, the model data 106 must first be processed by a graphics system 110. The graphics system 110 may receive the model data 106 and may also receive instructions from the graphical application 108 as to how the model data 106 should be processed.

The graphics system 110 may include any or all of a GPU and video memory, and it may use any or all of the CPU and system memory as well.

The term "GPU", as used herein, broadly refers to any graphics rendering device. This may include, but is not limited to discrete GPU integrated circuits, field-programmable gate arrays (FPGAs), application-specific integrated circuits (ASICs), discrete devices otherwise operable as central processing units, and system-on-a-chip (SoC) implementations. The term "CPU", as used herein, broadly refers to a device with the function or purpose of a central processing unit, independent of specific graphics-rendering capabilities, such as executing programs from system memory. In some implementations, it is possible that a SoC may include both a GPU and a CPU; in which case the SoC may be considered both the GPU and the CPU.

Figure 2:
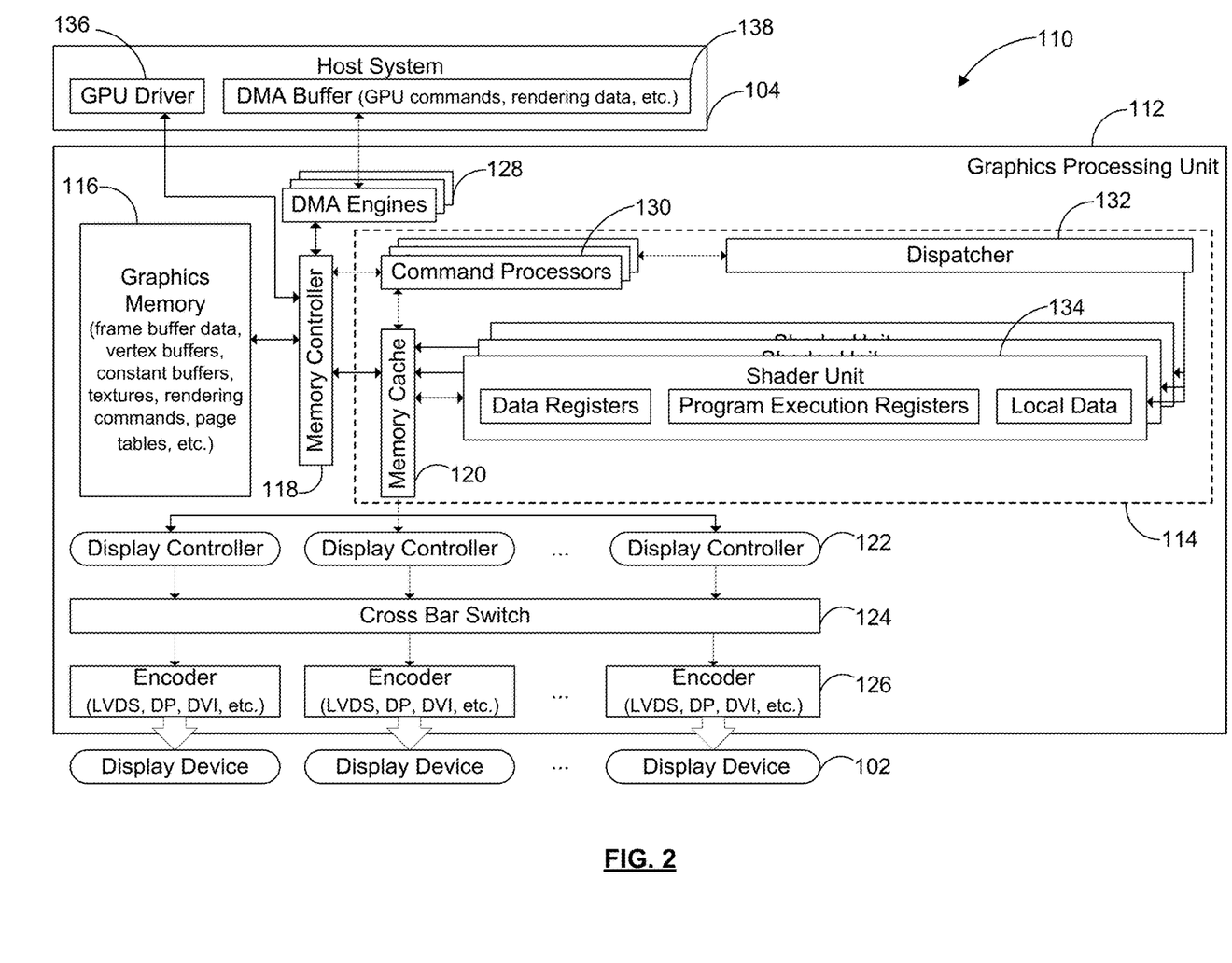
FIG. 2 is a high-level architectural diagram of a graphics system according to at least one embodiment.

Referring now to FIG. 2, illustrated therein is a graphics system 110 according to at least one embodiment. The graphics system 110 may include a GPU 112 and some of the computer 104. In this example the GPU 112 is shown as including graphics memory (sometimes referred to as video memory or VRAM) 116, a memory controller 118, memory cache 120, display controllers 122, a cross-bar switch 124, encoders 126, direct memory access (DMA) engines 128, command processors 130, a dispatcher 132, and shader units 134. Generally, the memory cache 120, command processors 130, dispatcher 132, and shader units 134 may be referred to collectively as a GPU engine 114. The GPU engine 114 may provide GPU subsystems.

Although the GPU 112 in FIG. 2 is shown to include components such as the display controller 122, cross-bar switch 124, and encoders 126, it will be understood that components such as the display controller 122, cross-bar switch 124, and encoders 126 may be logically separate entities from the GPU 112. In particular, the display controller 122, cross-bar switch 124, and encoders 126 may be logically and/or physically separate from the GPU 112.

The graphics system 110 may further include a GPU driver 136 and a DMA buffer 138, which are a part of the computer 104. The memory controller 118 may be coupled to the GPU driver 136. The DMA engines 128 may be coupled to the DMA buffer 138. The DMA buffer 138 may provide commands and rendering data 106 to the DMA engines 128 of the GPU 112, independently of the CPU. In some cases, DMA can also be used for "memory to memory" copying or moving of data within memory.

The graphics memory 116 may store data including, but not limited to, frame buffer data, command buffers, vertex buffers, constant buffers, textures, and page tables. The memory controller 118 may access data stored on the graphics memory 116 and provide data and commands to the GPU engine 114. The GPU engine 114 may process the data and commands—for example, using one or more command buffers—and in response, create an image that is provided to the memory controller 118 for storage in the graphics memory 116. The image may include one or more lines, wherein each line includes at least two pixels.

A display controller 122, via the memory controller 118 and in response to commands from, e.g., a GPU engine, may extract the image for display from the graphics memory 116. The display controller 122 may convert the image to a display output that is compatible with the display 102. The display output may be provided to the cross bar switch, which in turn, is provided to the encoders 126. The encoders 126 may be coupled to the display 102, and may encode the pixel data according to the format used for connection to the display 102. Examples of encoders include Low-Voltage Differential Signalling (LVDS), Digital Visual Interface (DVI), DisplayPort (DP), and the like.

Each of the display controllers 122 may have control registers stored in graphics memory 116 that are accessible by the GPU DMA engines 128. The control registers may be buffered or cached in such a manner that permits the GPU to instruct the display controller 122 which back buffer to use on the next display refresh by writing to the control register, whereupon the display controller 122 automatically switches to the back buffer indicated in the control register. In embodiments with a discrete GPU, the display controller registers generally are part of the GPU register address space. In embodiments with a SoC, the display controller registers may be in a separate address space. In such embodiments, the GPU can have bus access to the display controller address space and therefore, using its DMA engine, it can read or write display controller registers in the same way as the CPU.

As set out herein, the described embodiments generally provide for multiple-buffered display rendering without the use of hardware or software interrupts, which can have applications, e.g., in safety critical environments.

In the described embodiments, the GPU DMA controller (e.g., DMA engine 128) directly controls the display controller by reading and updating one or more registers. In at least some embodiments, a block of registers is read from the display controller, some registers altered and the block written back. In embodiments where the DMA controller cannot read single registers (the minimum amount of bytes is subject to specific GPU hardware), a block of bytes is read and written. This sequence of reading and writing to the display controller generally occurs in sequence with graphics drawing commands since they share the same command pipeline.

Figure 3:
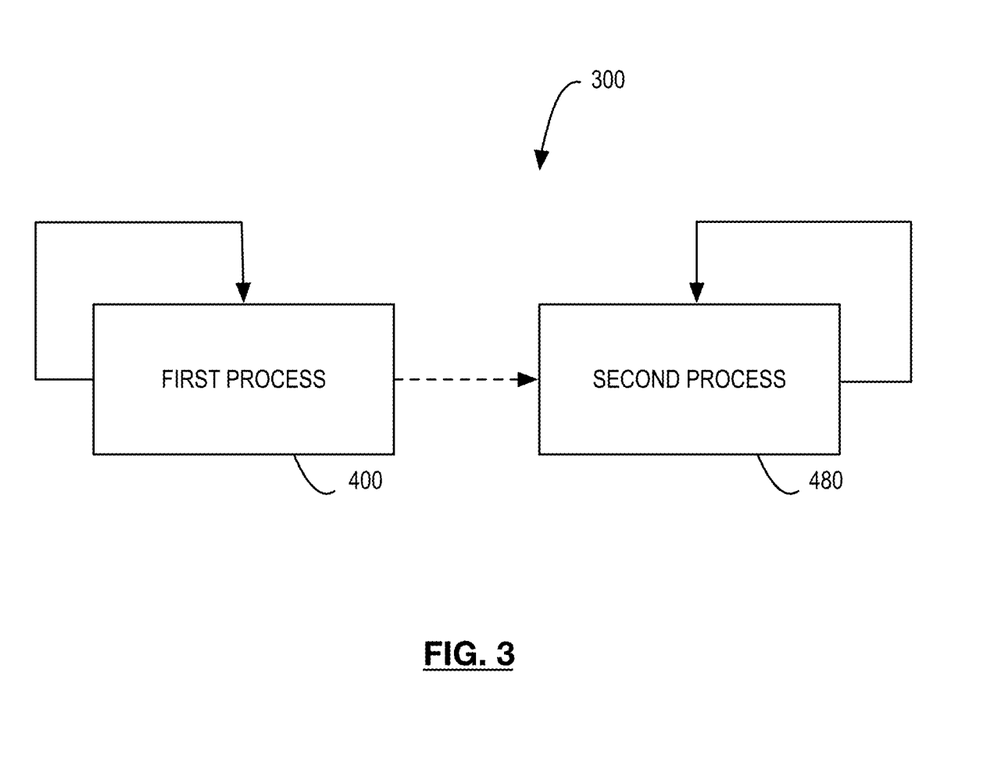
FIG. 3 is a process flow diagram for a method of buffered rendering in a safety critical environment according to at least one embodiment.

Referring now to FIG. 3, there is illustrated a process flow diagram for a method of buffered rendering in a safety critical environment. In particular, method 300 is a method of interrupt-free multiple buffering and may be performed, for example, by computer 104 and graphics system 110 as described herein.

Method 300 involves a first process 400, which repeats, and a second process 480, which also repeats independently of and asynchronously to first process 400. Process 400 generally is performed by a CPU and command processor of a GPU, such as a command processor 130. For example, a command processor 130 may be provided with one or more command buffer to execute. Each command buffer may be assigned to particular, independent GPU engines 114, or to independent command processors 130. Process 480 generally is performed by a display controller, such as display controller 122. Processes 400 and 480 are explained further with respect to FIGS. 4A and 4B, respectively.

Figure 4A:
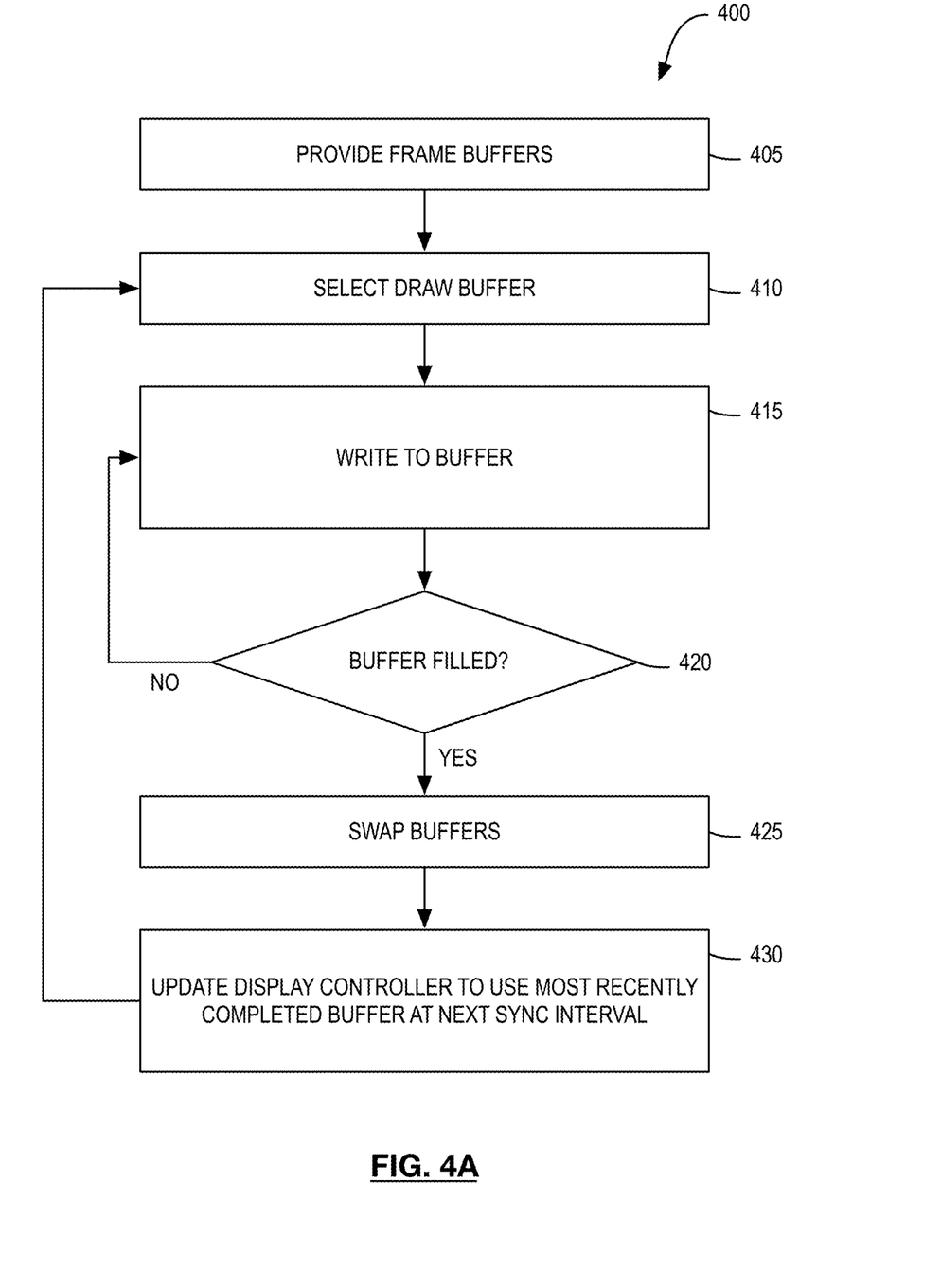
FIG. 4A is a process flow diagram for a first process used with the method of FIG. 3.

Referring now to FIG. 4A, there is illustrated a process flow diagram for a first process 400. As described, method 400 may be carried out by a CPU and a command processor of a GPU.

Method 400 begins at 405, with the system providing a plurality of frame buffers in a memory accessible to the processor, the GPU and the display controller. The plurality of frame buffers may be interchangeably designated as a front buffer and one or more back buffers. For example, if there are three buffers (buffer 1, buffer 2, buffer 3), then at any given time, one of the three buffers can be designated the front buffer (e.g., buffer 2) and the other two buffers are then designated back buffers (e.g., buffer 1, buffer 3). The front buffer may be re-designated at any time. For example, if buffer 3 is designated the front buffer, then buffer 2 ceases to be designated the front buffer and becomes a back buffer.

At 410, the processor (e.g., CPU) chooses a selected frame buffer from the plurality of frame buffers (e.g., the back buffers). The selected frame buffer will be used for writing data. Generally, the processor selects the selected frame buffer based on its availability to accept new data; for example, the selected frame buffer is not the front buffer and generally has the oldest data (data that has aged the most relative to the other buffers).

At 415, the processor writes data for a new frame for possible display, a selected frame, to the selected frame buffer.

Upon completing the selected frame at 420, the processor transmits a swap buffer signal to the GPU at 425.

In response to the swap buffer signal, the GPU updates the display controller at 430 to indicate that the selected frame buffer is a ready frame buffer that is eligible to become the front buffer at the next display synchronization interval. Updating the display controller may involve a DMA engine of the GPU writing to a register of the display controller to indicate the ready frame buffer. For example, the display controller may have registers in a directly addressable and writeable memory, and the DMA engine may directly access and write to the register. In some cases, the register may be writable in blocks, in which case the DMA engine may handle block writes to a plurality of register that contain the relevant display register for identifying a memory address of the ready frame buffer in a shared memory.

The processor and GPU then return to 410 to select a new selected frame buffer from the available back buffers. The new selected frame buffer generally will contain the oldest data. Process 400 then repeats independently of method 480, described further with reference to FIG. 4B.

Figure 4B:
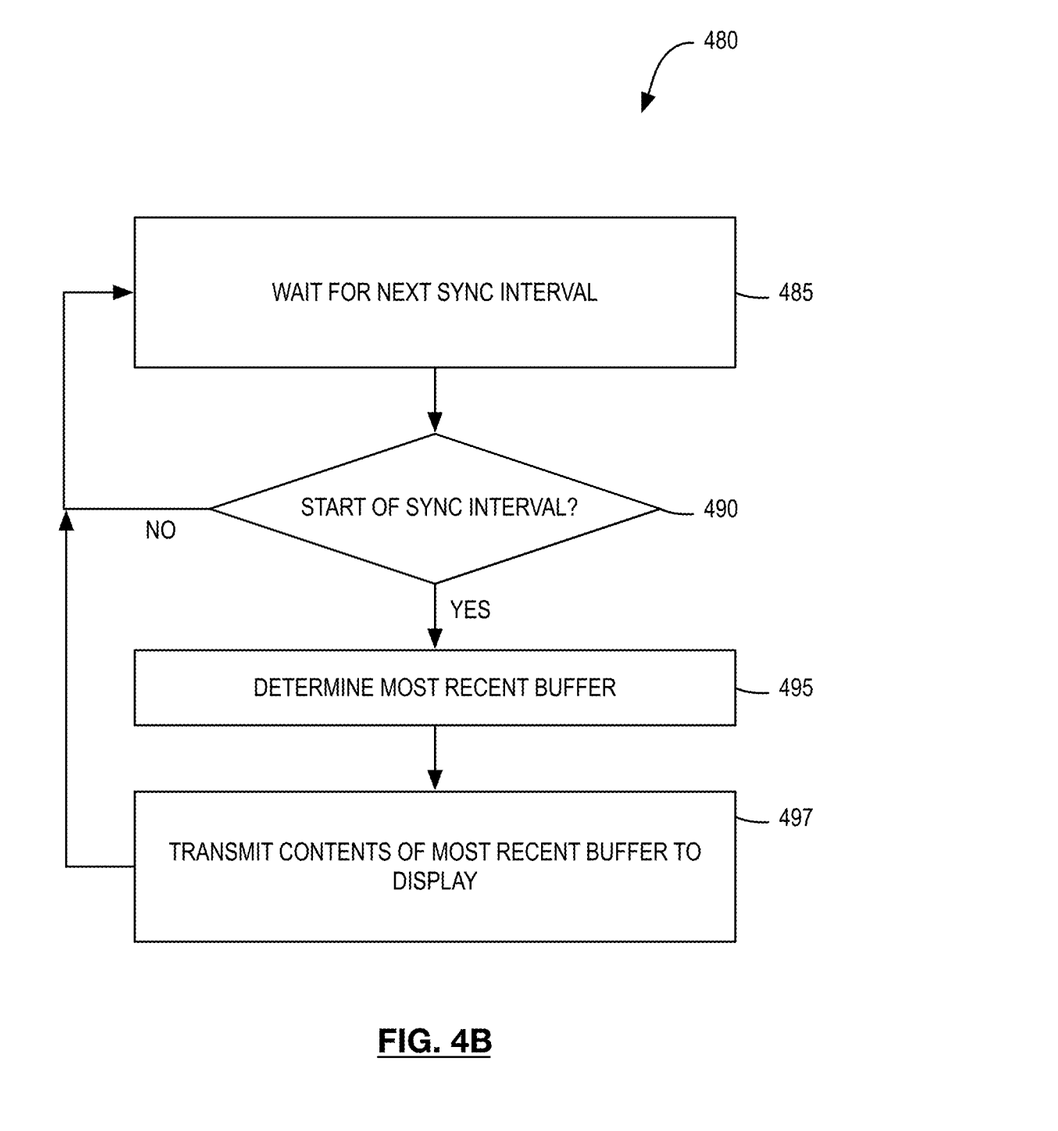
FIG. 4B is a process flow diagram for second process used with the method of FIG. 3.

Referring now to FIG. 4B, there is illustrated a process flow diagram for a second process 480. As described, method 480 may be carried out by a display controller, independently of and asynchronously to method 400.

At 485, the display controller monitors for a display synchronization interval of a display to begin. At 490, the display controller detects that a display synchronization interval is occurring.

In response to detecting the display synchronization interval, the display controller determines the most recently completed buffer—the ready frame buffer—for display at 495. In at least some embodiments, the display controller determines the most recent buffer based on a register setting.

In some cases, more than one frame may have been completed in between display synchronization intervals. In such cases, only the most recently completed buffer (the ready frame buffer) is selected to become the new front buffer.

At 497, the display controller sets the ready frame buffer as the front buffer and transmits contents of the front buffer to the display.

The display controller then returns to 485 to monitor for the next display synchronization interval. Process 480 thus repeats independently of method 400, described above with reference to FIG. 4A.

Using the described approach, the GPU and display controller do not need to communicate back to the CPU via interrupts, which may allow for easier porting to different operating systems and platforms, a less complicated system in terms of CPU and integration, and may provide a system performance gain.

Figure 5:
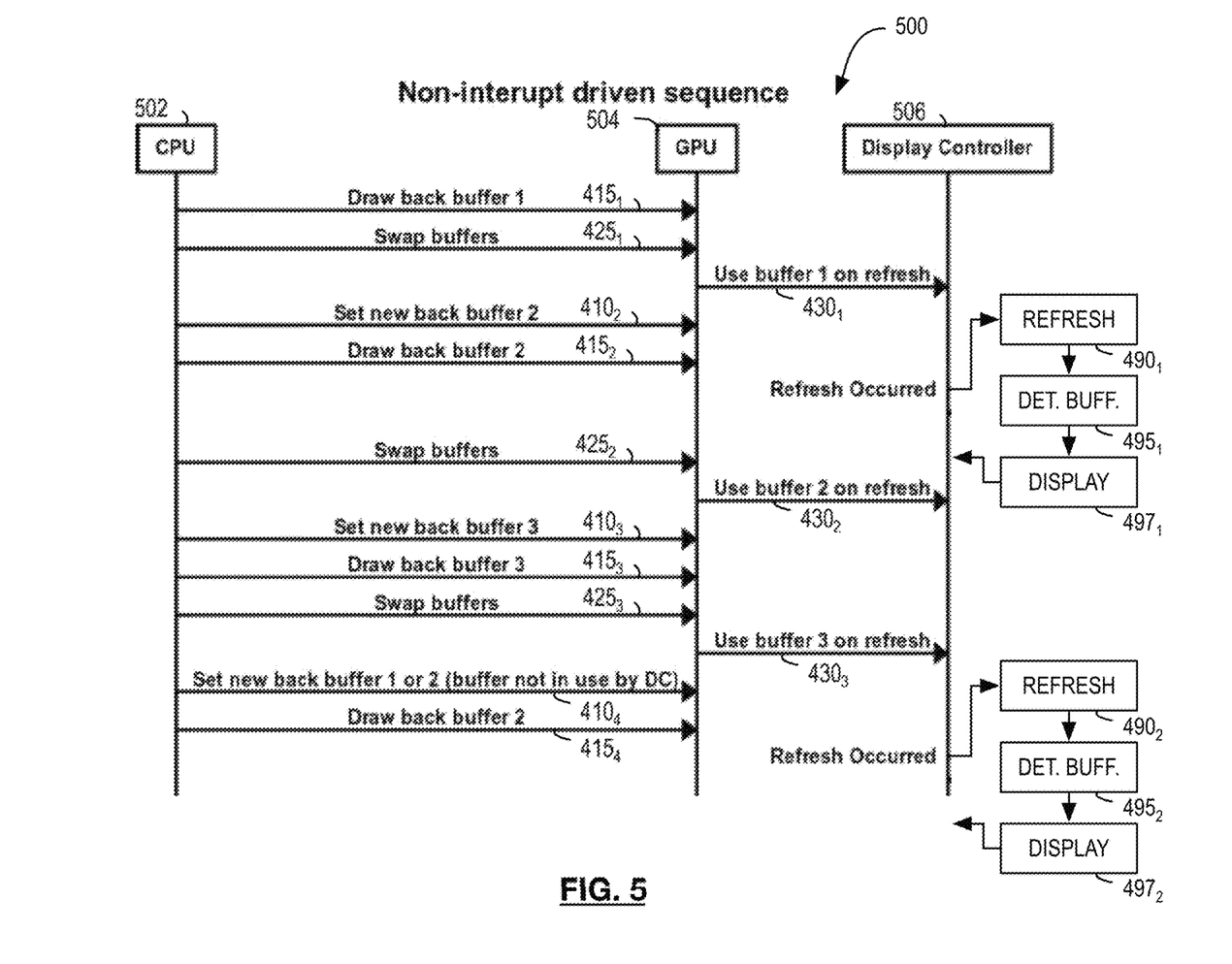
FIG. 5 is a timing diagram illustrating the execution of the method of FIG. 3 in one example.

Referring now to FIG. 5, there is provided a timing diagram illustrating the execution of method 300 (and processes 400 and 480) in one example. Timing diagram 500 illustrates acts performed by a CPU 502, GPU 504 and display controller 506.

Timing diagram 500 illustrates several iterations of both processes 400 and 480. Successive performances of each act of a process are indicated using successive subscripts. For example, successive performance of the transmitting a swap buffer signal (i.e., 425 in process 400) are indicated in FIG. 5 as $425_1$, $425_2$, $425_3$, etc.

In the example of timing diagram 500, it can be observed that the display synchronization interval is slower than the GPU rendering rate. As a result, buffers may be marked as ready frame buffers, but not actually displayed at the next display synchronization interval, since a newer frame may have been marked as the ready frame buffer in the interim. For example, at $430_2$, a frame buffer is marked as the ready frame buffer, then at $430_3$, another frame buffer is marked as the ready frame buffer. When this occurs, the earlier ready frame buffer (i.e., the buffer indicated at $430_2$) may become available for re-use. When the next display synchronization interval occurs and is detected at $490_2$, the frame buffer marked as the ready frame buffer at $430_3$ will become the front buffer.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

I claim:

1. A method of display buffering between a processor, a graphics processing unit (GPU) and a display controller, the method comprising:
    providing a plurality of frame buffers in a memory accessible to the processor, the GPU and the display controller, the plurality of frame buffers interchangeably designated as a front buffer and one or more back buffers;
    in a first repeating process:
        the processor writing data for a selected frame to a selected frame buffer of the plurality of frame buffers in the memory;
        upon completing the selected frame, the processor transmitting a swap buffer signal to the GPU;
        in response to the swap buffer signal, a direct memory access (DMA) engine of the GPU writing to a register of the display controller to indicate that the selected frame buffer is a ready frame buffer that is to become the front buffer when a display synchronization interval occurs;
        updating the selected frame buffer to one other of the one or more back buffers; and
    in a second repeating process carried out asynchronously to the first repeating process:
        the display controller monitoring for the display synchronization interval of a display to begin;
        upon start of the display synchronization interval, the display controller identifying the ready frame buffer; and
        in response to determining the ready frame buffer, the display controller setting the ready frame buffer as the front buffer and transmitting contents of the front buffer to the display.

2. The method of claim 1, further comprising, in the first repeating process, prior to writing data to the selected frame buffer, the processor choosing the selected frame buffer from the one or more back buffers.

3. The method of claim 2, wherein the processor chooses the selected frame buffer based on its availability to accept new data.

4. The method of claim 1, wherein the writing to the register comprises block writing to a plurality of registers comprising the display register.

5. The method of claim 1, wherein the ready frame buffer is determined from the register of the display controller.

6. The method of claim 1, wherein the register indicates a memory address of the selected frame buffer in the memory.

7. The method of claim 1, wherein the memory is directly accessible by the display controller.

8. A non-transitory computer readable medium storing computer-executable instructions, which when executed by a graphics unit comprising first and second command processors, cause the graphics unit to carry out the method of claim 1.

9. A system for non-interrupt-based asynchronous display buffering, the system comprising:
   a display;
   a memory, the memory storing a plurality of frame buffers, the plurality of frame buffers interchangeably designated as a front buffer and one or more back buffers;
   a processor, the processor configured to repeatedly:
      write image data for a selected frame to a selected frame buffer of the plurality of frame buffers in the memory;
      upon completing the selected frame, transmit a swap buffer signal;
   a graphics processing unit (GPU) having a direct memory access (DMA) engine, the GPU configured to repeatedly, in response to the swap buffer signal, indicate that the selected frame buffer is a ready frame buffer that is to become the front buffer when a display synchronization interval occurs, wherein indicating that the selected frame buffer is the ready frame buffer comprises the DMA engine of the GPU writing to a register of a display controller; and
   the display controller, the display controller configured to, repeatedly and asynchronously to operation of the processor and the GPU:
      monitor for the display synchronization interval of a display to begin;
      upon start of the display synchronization interval, identify the ready frame buffer; and
      in response to identifying the ready frame buffer, set the ready frame buffer as the front buffer and transmit contents of the front buffer to the display.

10. The system of claim 9, wherein, prior to writing data to the selected frame buffer, the processor is configured to the selected frame buffer from the one or more back buffers.

11. The system of claim 10, wherein the processor chooses the selected frame buffer based on its availability to accept new data.

12. The system of claim 9, wherein the writing to the register comprises block writing to a plurality of registers comprising the display register.

13. The system of claim 9, wherein the ready frame buffer is determined from the register of the display controller.

14. The system of claim 9, wherein the register indicates a memory address of the selected frame buffer in the memory.

15. The system of claim 10, wherein the memory is directly accessible by the display controller.

* * * * *